United States Patent [19]

Burgeson et al.

[11] Patent Number: 4,482,878
[45] Date of Patent: Nov. 13, 1984

[54] INTEGRATED CONDUCTOR AND COIL STRUCTURE FOR SUPERCONDUCTING COILS

[75] Inventors: John E. Burgeson; Gary S. Kruse, both of San Diego, Calif.

[73] Assignee: General Dynamics Corporation/Convair Div., San Diego, Calif.

[21] Appl. No.: 224,327

[22] Filed: Jan. 12, 1981

[51] Int. Cl.³ .............................................. H01F 7/22
[52] U.S. Cl. .............................. 335/216; 174/15 CA
[58] Field of Search ................... 335/216; 174/126 S, 174/128 S, 15 CA

[56] References Cited

U.S. PATENT DOCUMENTS

| | | | |
|---|---|---|---|
| 3,428,926 | 2/1969 | Bogner et al. | 335/216 |
| 3,869,686 | 3/1975 | Benz | 335/216 |
| 3,946,348 | 3/1976 | Schleich | 174/126 S |
| 3,980,981 | 9/1976 | Boom et al. | 335/216 |
| 3,983,521 | 9/1976 | Furuto et al. | 335/216 |
| 4,176,238 | 11/1979 | Vulis et al. | 174/128 S |
| 4,184,042 | 1/1980 | Vulis et al. | 174/128 S |
| 4,189,693 | 2/1980 | Satti | 174/128 S |
| 4,333,228 | 6/1982 | Koch | 335/216 X |

OTHER PUBLICATIONS

Proceedings of the Seventh Symposium on Engineering Problems of Fusion Research, Knoxville, TN, USA, Oct. 1977, pp. 1278-1281, William A. Fietz.

Primary Examiner—George Harris
Attorney, Agent, or Firm—John R. Duncan; Frank D. Gilliam

[57] ABSTRACT

A superconducting coil having an elongated longitudinally extending first hollow metallic housing and adapted to provide a cooling passage of liquid helium therein. At least one superconducting metallic conductor is disposed within the housing which is surrounded with an electrical and thermal insulating material. An elongated second metallic housing surrounds the inner insulated structure and is adapted to be mechanically connected to similar structure when arranged into a coil structure having a predetermined configuration. A method of manufacture is also disclosed as well as how the novel integrated coil and case structure is advantageously employed in an improved fusion reactor structure and Magneto Hydrodynamic Magnet Structure.

14 Claims, 11 Drawing Figures

INTEGRATED CONDUCTOR AND COIL STRUCTURE FOR SUPERCONDUCTING COILS

BACKGROUND OF THE INVENTION

1. Field of the Invention

This invention relates generally to improvements in the construction of superconducting coils, and more particularly but not by way of limitation, to an integrated conductor and coil structure for superconducting coils used in the structure of fusion reactors.

2. Description of the Prior Art in the past, the design of Large Superconducting Magnets for fusion reactors has been characterized by superconducting coil construction that utilized a thick external stainless steel case construction which had inherent large weldments and potential for warpage problems. The heavy and thick coil outer case structure is also heir to such problems as the difficulty of obtaining such large material from steel mills and having it free of internal material defects and large grain size. Such thick material is subject to large tolerances and is subject to crown, bow and other deformations. The cutting, machining and handling of such material, requires very large special machines resulting in high cost of fabrication. Afterwhich such construction requires large welds with a resulting case warpage. These comments are to be taken in the context of 300 ton and greater magnets.

SUMMARY OF THE INVENTION

It is believed that such difficulties are obviated by the present invention with its inherent advantages. The present invention contemplates integrating the coil conductor winding with the structural material usually provided by conventional external case structure. This is accomplished by dividing the minimum available coil cross sectional area into equal size cellular elements. Each cellular element or cell is comprised of a stabilized superconductor element, and liquid helium, with electrical insulation surrounding the stabilizing element and electrically insulating it from an external stainless steel jacket structure. These cells may be manufactured in long lengths and placed on large diameter reels until required for the coil winding operation. As a coil is wound by use of the cells of the subject invention the external jacket structure of each turn is welded along its entire length to the adjacent turn external jacket.

It will be seen that the present invention assures a tight conductor pack and eliminates conductor movement or slippage which can result in coils going normal. It also permits more efficient utilization of the available space thereby resulting in more efficient magnets with greater reliability and higher safety margins. The subject invention also eliminates the thick external case structure and the associated large weld and warpage problems as well as the other shortcomings detailed above. The invention may be used on all types of superconducting coils.

Another aspect of the present invention is the particular advantages provided in its employment in a superconducting coil for magneto hydrodynamics (MHD). MHD is an aerodynamic method of converting fuel directly and efficiently to electricity by the interaction of a flowing iodized gas with a magnetic field. Fuel is burned to produce the iodized gas, which acts as a conductor of electricity as it passes through a magnetic field. The heat can come from any fuel, fossil or nuclear.

The significant way the resulting structure reduces parts, simplifies the structure and is less costly than was known heretofore. In a typical pool boiling MHD design, the winding pack uses filler wedges and filler blocks to support and pack the conductor and is provided with external frames to react coil radial loads. In an integrated conductor and structure MHD design. the construction is substantially simplified. The helium vessel is eliminated as well as the external support frames outside the helium vessel. The diameter of the vacuum vessel, radiation sheild and MLI are substantially reduced, due to the more efficient magnet structure thereby reducing the weight and the number of detail parts. The integrated conductor and structure of the present invention then, because of the smaller frame diameter, reduces the frame bending moment very substantially. With the integrated structure, conductor movement and slippage is eliminated.

In a coil integrated MHD, the integrated coils surround a frustoconical inner shell while a similarly shaped outer shell is provided with a plurality of annular longitudinally spaced webs extending inwardly normal to the center line of the MHD to contact the winding to provide shear continuity. Thus, a large material saving is affected by eliminating case filler blocks between the winding sections.

Other objects and advantages of the invention will be evident from the following detailed description when read in conjuction with the accompanying drawings.

DETAILED DESCRIPTION OF THE PREFERRED EMBODIMENT

Figure 1:
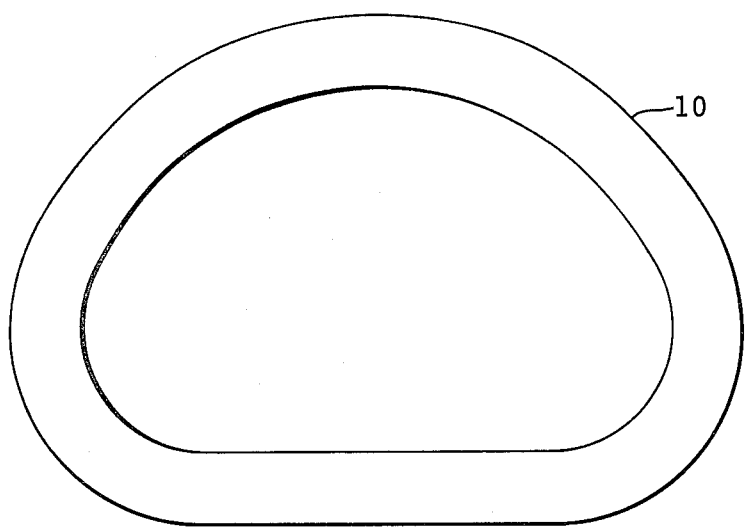
FIG. 1 is a top diagrammatic view of a ETF 12 TESLA coil illustrative of the state of the prior art.
Figure 2:
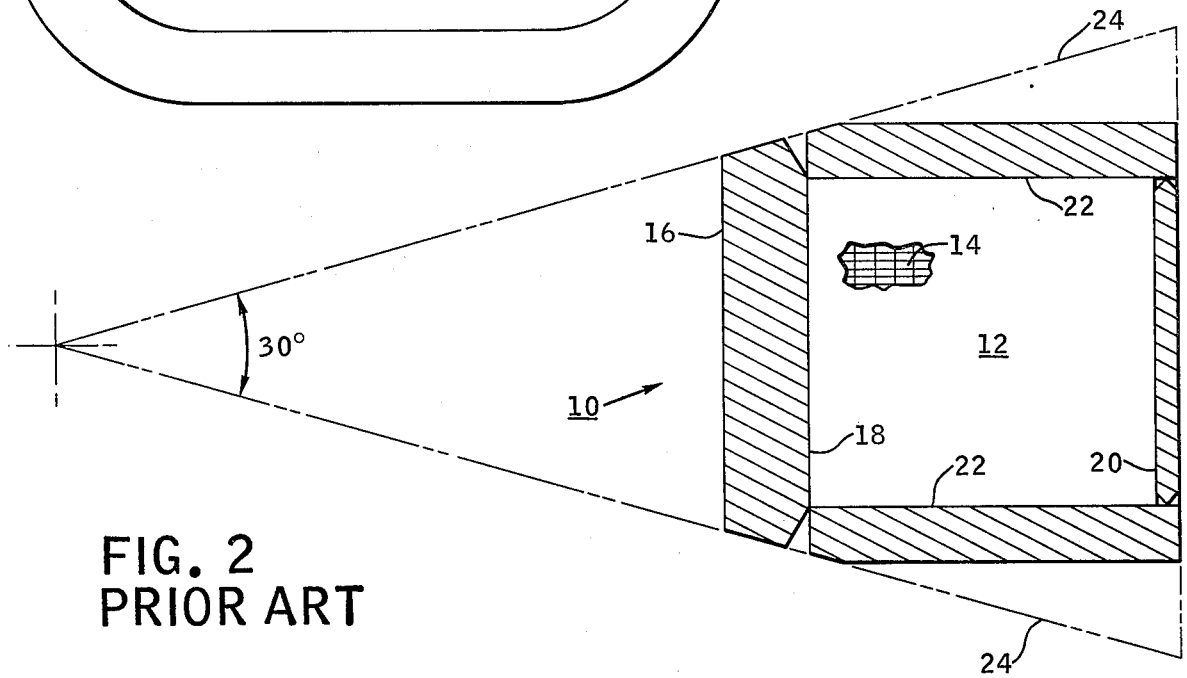
FIG. 2 is a partial cross section of the 12 TESLA coil shown in FIG. 1 and further demonstrating the present prior art.

Referring now to FIGS. 1 and 2 an EFT 12 TESLA coil 10 is illustrated as examplary of the prior art. As seen in FIG. 1, the coil 10 would weigh around 330 tons and comprise a central coil pack 12 comprising a plurality of windings 14 shown diagrammatically. The conductor pack 12 is encompassed within a thick external case 16 made of a typical 8.0' thick inner ring 18 and an 2.0' inner ring 20 welded to upper and lower side plates 22, each approximately 5.0' in thickness. As seen in FIG. 2 there are upper and lower unused areas 24 within the space area available to the coil 10. Typically, the windings 14 are insulated with G-10 CR insulation which contracts more than copper and steel thereby resulting in a loose conductor pack.

The thick plates and forgings required for the coil 10 give rise to many problems. The flatness and waviness tolerances are large on thick stainless plate which are difficult to handle and to machine. Obviously, cutting and machining such plates is expensive and since errors are apt to occur, further expense is added. In addition to the difficulties and expense associated with the manufacture of a large heavy structure this type of construction require shimming between the case and the conductor pack thereby adding to the manhours required to manufacture the coil 10.

Figure 4:
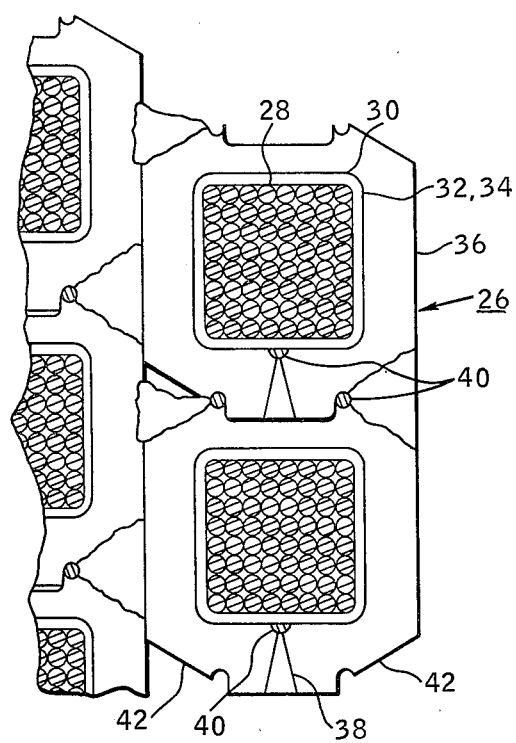
FIG. 4 is a cross section of the integrated conductor and coil structure shown in FIG. 3 employed in a 12 TESLA coil.

Referring now to FIG. 4, an integrated conductor and coil structure 26 embodying the present invention is illustrated. The integrated structure 26 includes a plurality of superconductors 28 made for example of $Nb_3Sn$ or NbTi enclosed within an hollow metallic stabilizing housing 30, preferably made of copper. The housing 30 is then surrounded by a Kapton film 32 to provide electrical insulation. The Kapton film 32 may be "baseball bat" wrapped around the exterior of the housing 30, and in addition, a glass fabric tape 34 may be similarly wrapped around the Kapton film 32 to provide a secondary electrical barrier and a thermal protection barrier for the Kapton film 32 for the welding operation hereinafter described.

A metallic housing 36, preferably composed of stainless steel, is formed around the insulated inner structure by any suitable method, such as roll forming to completely surround it. The housing 36 is then completely closed by welding along a longitudinal seam 38 by TIG welding. A longitudinally extending chill bar 40 precludes damage to the insulated inner structure during welding. The housing 36 provided with chamfered corners 42 to permit sufficient weld material and depth of weld as an integrated coil and case structure is welded to a similar structure. As before, chill bars 40 are utilized to prevent damage to the inner structure during welding.

The cross-sectional size of the integrated coil and case structure as applied to an EFT size superconducting toroidal field coil for a Tokamak fusion reactor is determined by dividing the cross-sectional area of the coil bucking post region, where the area is the least for a toroidal field coil, into equal size cellular elements. Each cell 26 is then constructed as described hereinbefore in the description of FIG. 4. It will be seen in FIG. 3 that when superconducting coil is made with the integrated coil and case structure of the instant invention that the coil 44 may have a full trapezoidal cross sectional area as illustrated. Contrasting the coil 44 of FIG. 3 made by utilizing the instant invention with the coil 10 of the prior art seen in FIG. 1 the vast improvement is self evident.

Figure 5:
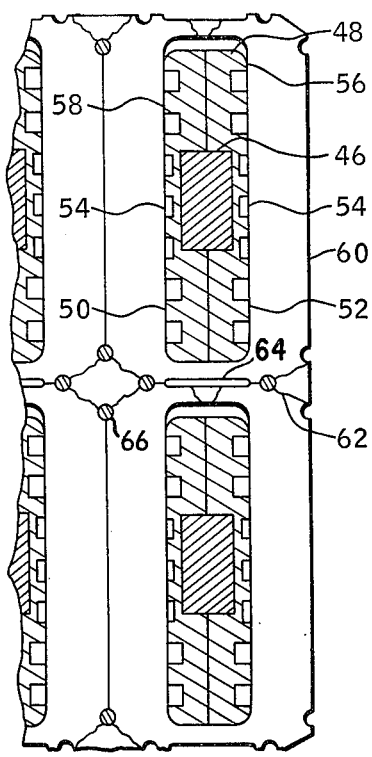
FIG. 5 is another embodiment of the integrated conductor and coil structure of the present invention.

A second embodiment of the instant invention is seen in FIG. 5. In this embodiment, an elongated central superconductor 46 is completely enclosed with an outer stabilizer structure 48 which is preferably made of copper and is separable into two halves 50 and 52. Each portion of the stabilizer structure 48 is provided with a plurality of longitudinally extending grooves 54 spaced around the outer periphery in order to permit a cooling flow of liquid helium therethrough. As before, the stabilizer structure 48 is wrapped first with a Kapton film 56 and second, with a glass fabric tape 58 to provide a first electrical insulation and a second electrical insulation and thermal barrier. A stainless steel outer housing 60 provided with chamfered outer corners 62 is roll formed around the insulated inner structure and closed by a longitudinally welded seam 64. In the illustrated embodiment of FIG. 5, it will be seen that a chill bar is not used during closure of the housing 60 since the insulated inner structure is spaced sufficiently from the outer housing 60 to preclude thermal injury during the welding operation.

Figure 3:
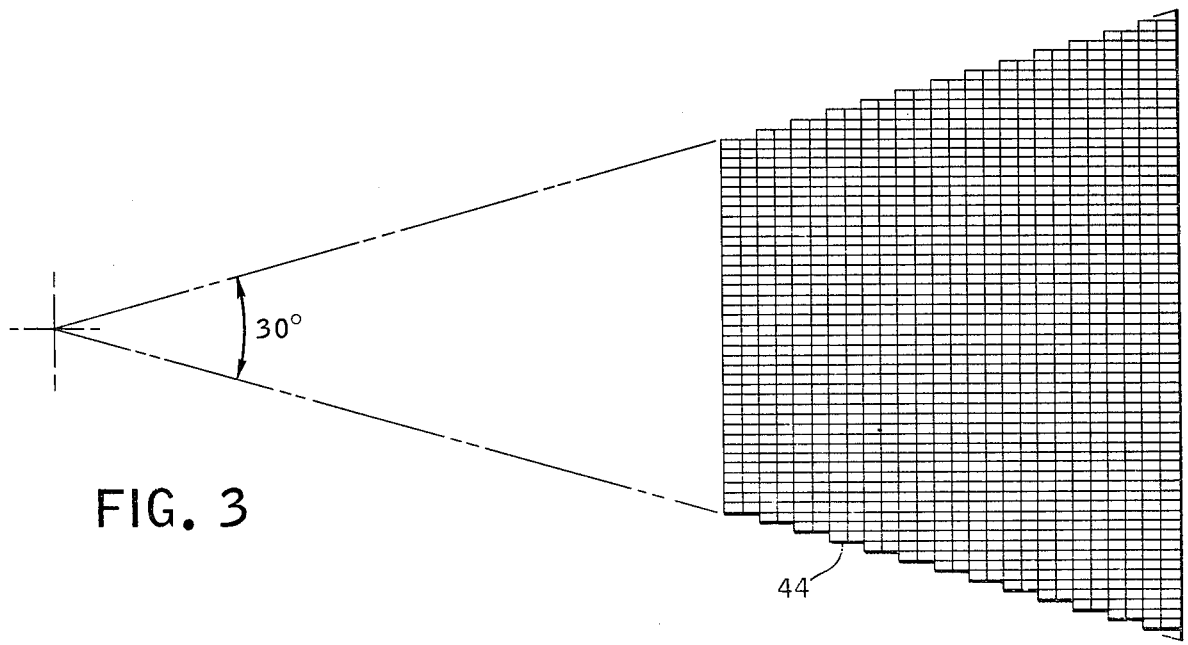
FIG. 3 is a partial cross section of a 12 TESLA coil embodying this invention.

Chill bars 66, however, may be utilized advantageously as each cell is welded longitudinally to a similar cell during construction of a superconducting coil as seen in FIG. 3.

The present invention also yields an added advantage of being readily adaptable to an on site automated process line for coils. At a coil manufacturing site, the external insulation of the Kapton film and the glass fabric tape would be wrapped on the metallic housing containing the superconductor or superconductors. The stainless steel outer housing would then be roll formed around the insulated inner structure and closeout welded.

The integrated conductor and core structure would be processed in sufficient lengths to accomplish the desired winding of coils and then wound on large diameter reels until required for actual winding of the coil. A removable mandrel is then utilized for a form as the coil having a desired shape is wound in a convential manner. As the coil is wound to its desired configuration, the illustrated integrated coil and case structure of the instant invention is welded to the adjacent similar structures along its entire length to manufacture the coil as described. Due to the long length and relatively small welding size required, automated weld techniques are utilized. It will be recognized that the coil may be wound in any configuration and that present invention is particularly suited to the winding of coils into complex configurations.

As previously described, it will be seen that the integrated coil and case structure of the present invention provides substantial advantages over the prior art. As was demonstrated, by using all of the available space envelope for the coil cross section in the bucking post area, as seen in FIG. 3, results in additional area for the coil structure and provides higher operating safety margins and also permits reducing the size of the space envelope thereby resulting in a smaller coil with reduced weight and cost.

The entire coil cross section of the present invention is effective in carrying the axial, bending, shear, and torsion loads. In addition, the coil has a high moment of inertia compared to the plate bending of the conventional coil case shown in FIGS. 1 and 2, thereby resulting in the low stress for a coil out condition of a Tokamak fusion reactor.

A major problem in a conventional Tokamak toroidal field coil, is that the conductors transmit their radial load to the next conductor thereby resulting in high bearing pressures against the coil outer ring. In the present invention conductor, radial load buildup is substantially reduced in the bucking post region of the coils since the integral stainless steel housing 36 in the first embodiment and 60 in the second embodiment provide an alternate load path.

In the present invention, conductor movement or slippage is eliminated and shimming is not required nor is epoxy potting required between conductor winding and the case structure.

By eliminating the heavy and thick case structure seen in FIGS. 1 and 2, all of the problems associated with such construction has also been eliminated. The problems inherent in dealing with large plates and forgings and the machining thereof are manifest.

Figure 6:
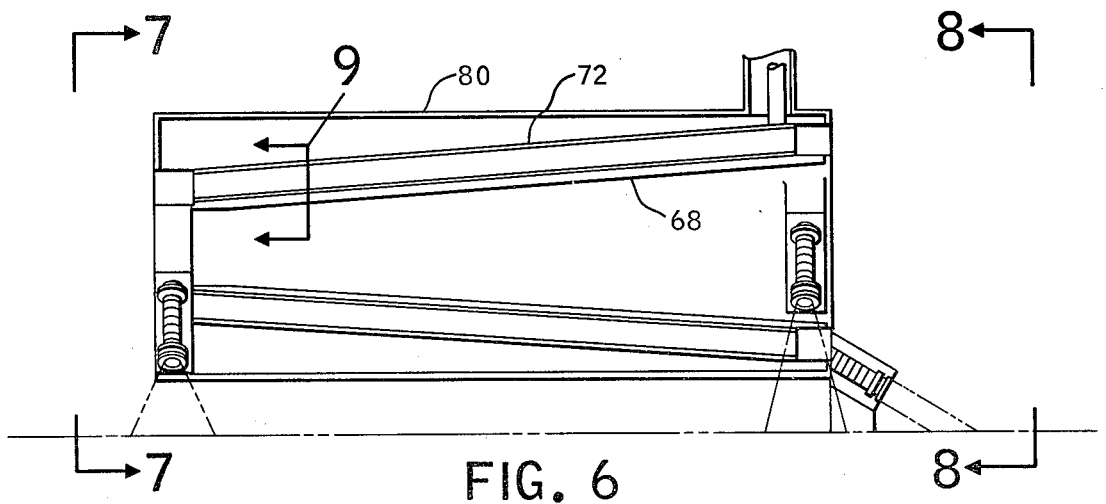
FIG. 6 is a diagrammatic partial longitudinal section of an integrated conductor and structure MHD.
Figure 7:
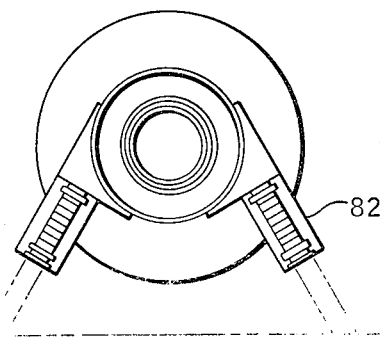
FIG. 7 is an end elevation of the MHD shown in FIG. 6.
Figure 8:
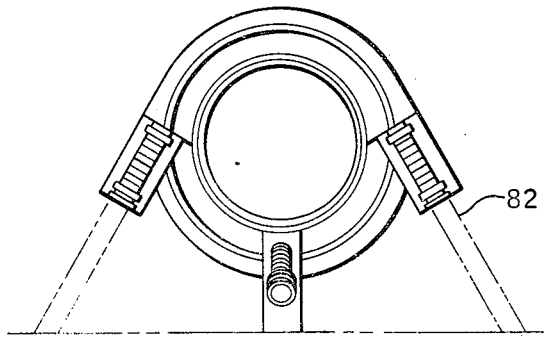
FIG. 8 is an opposing end elevation of the MHD shown in FIG. 6.
Figure 10:
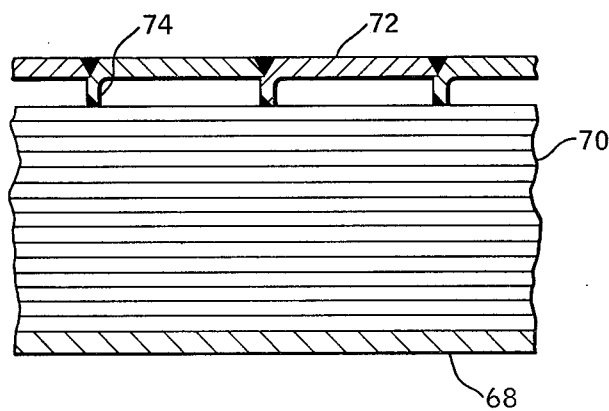
FIG. 10 is a partial longitudinal section taken along lines 10—10 of the integrated conductor and structure coil of FIG. 9.

Referring now to FIGS. 6, 7, and 8, it will be seen how the integrated coil and conductor structure of the present invention may be advantageously utilized in construction of a MHD magnet. The magnet, utilizing the present invention, includes an inner frustro-conical inner frame cap 68 along which are arranged the integrated coil structures 70 welded together in a winding. An outer frame cap 72 surrounds the coil structures 70, as seen in greater detail in FIG. 10. The outer frame cap 72 is provided with inwardly extending webs 74 spaced along length of said frame.

Figure 9:
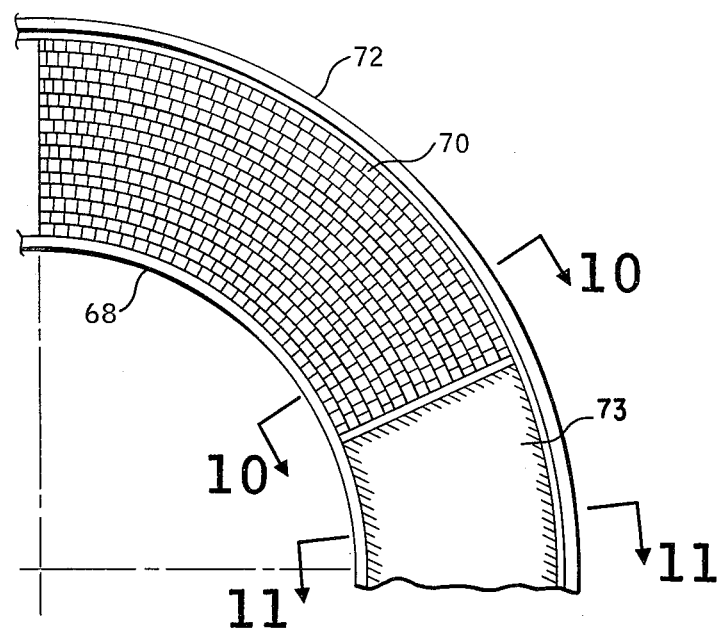
FIG. 9 is a partial cross section of the winding cavity seen in FIG. 6 taken along lines 9—9.

As seen in FIG. 9, a web 73 is interposed between the inner and outer frame caps 68 and 72 to position the coil structures as desired.

Figure 11:
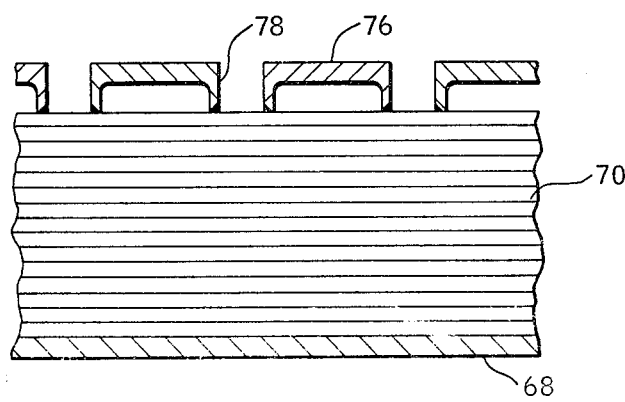
FIG. 11 is a partial longitudinal section taken along lines 11—11 of FIG. 9.

In FIG. 11, a second embodiment of the outer frame is illustrated wherein the outer frame comprises a plurality of spaced frame members, each of which is provided with at least two inwardly extending webs 78 contacting integrated coil structure.

A suitable vacuum vessel 80 surrounds the outer frame 72 and is provided with suitable support members 82. Suitable electrical and helium connections are provided as is well known in the art.

As will be seen in FIGS. 6 to 8, a MHD magnets utilizing the integrated coil structure of the instant invention eliminates the helium vesel and external frames of the conventional cask MHD. This permits a reduction in number of parts and weight as well as a substantial reduction in the diameter of the vacuum vessel, radiation shield, and MLI. Due to the smaller diameter the frame bending moment is reduced approximately 50 percent.

From the foregoing it will be apparent that the present invention provides a novel integrated coil and case structure for superconducting coils. Use of the present invention makes possible substantial improvement in the construction of superconducting coils for fusion reactors.

Changes may be made in the combination and arrangement of parts or elements as heretofore set forth in the specification and shown in the drawings without departing from the spirit and scope of the invention as defined in the following claims.

What is claimed as new and useful and desired to be secured by United States Letters Patent is:

1. A superconducting coil comprises:
   an elongated longitudinally extending first hollow metallic housing;
   at least one superconducting metallic conductor disposed within said metallic housing;
   an electrically and thermally non-conductive material surrounding said first metallic housing;
   cooling passages positioned between said at least one superconducting metallic conductor and electrically and thermally non-conductive material; and
   an elongated second metallic housing surrounding the electrically insulated first metallic housing and adapted to be mechanically connected to a similarly constructed structure.

2. The combination of claim 1 wherein the first housing is provided with a plurality of longitudinally extending passages spaced around the exterior of the housing to permit the flow of cooling fluid therethrough.

3. The combination of claim 1 wherein the first housing comprises two separable portions.

4. The combination of claim 1 wherein the first housing comprises a unitary housing and a plurality of longitudinally extending superconducting conductors are disposed therein and the cooling fluid flows within the housing and between said conductors.

5. The combination of claim 4 wherein the conductors are composed of $Nb_3Sn$ and the cooling fluid is liquid helium.

6. The combination of claim 1 wherein the electrically nonconductive material comprises at least one wrapping of Kapton film completely overlapped around the exterior of the first housing.

7. The combination of claim 6 wherein a second wrapping of glass fabric is provided around the wrapping of Kapton film.

8. The combination of claim 1 wherein the second metallic housing is formed around the first wrapped housing and welded along a longitudinal seam to complete the closure.

9. The combination of claim 8 wherein the second metallic housing is composed of stainless steel.

10. The combination of claim 8 wherein a chill bar is disposed adjacent the closure of the second metallic housing to prevent injury to the wrapped first housing when the closure is completed by welding.

11. The combination of claim 1 wherein said second metallic housing is provded with chamfered corners to permit longitudinal welding of said second metallic housing to adjacent similar structures in a predetermined structure.

12. In a structure of a superconductive coil comprising:
   an inner frame of a frusto conic configuration;
   a plurality of integrated superconducting coil and case structures around said inner frame and secured to each other by welding to form a coil structure; and
   an outer frame having a frustro conic configuration and surrounding the coil structure, the outer frame being provided with a plurality of longitudinally spaced inwardly extending webs contacting the coil structure.

13. The combination of claim 12 wherein the outer frame structure comprises a plurality of longitudinally spaced structures, each provided with at least two inwardly extending webs.

14. The combination of claim 12 wherein at least one spacer web is interposed between the inner and outer frame structures in order to separate predetermined coil windings.

* * * * *